United States Patent
Aerni et al.

(10) Patent No.: US 11,720,825 B2
(45) Date of Patent: Aug. 8, 2023

(54) FRAMEWORK FOR MULTI-TENANT DATA SCIENCE EXPERIMENTS AT-SCALE

(71) Applicant: salesforce.com, inc., San Francisco, CA (US)

(72) Inventors: Sarah Aerni, San Francisco, CA (US); Luke Sedney, San Mateo, CA (US); Kin Fai Kan, Sunnyvale, CA (US); Till Christian Bergmann, San Mateo, CA (US)

(73) Assignee: Salesforce, Inc., San Francisco, CA (US)

(*) Notice: Subject to any disclaimer, the term of this patent is extended or adjusted under 35 U.S.C. 154(b) by 1006 days.

(21) Appl. No.: 16/263,927

(22) Filed: Jan. 31, 2019

(65) Prior Publication Data
US 2020/0250587 A1 Aug. 6, 2020

(51) Int. Cl.
*G06N 20/20* (2019.01)
*G06F 11/34* (2006.01)
*G06N 5/043* (2023.01)

(52) U.S. Cl.
CPC ......... *G06N 20/20* (2019.01); *G06F 11/3466* (2013.01); *G06N 5/043* (2013.01)

(58) Field of Classification Search
CPC ....... G06N 3/08–088; G06N 5/00–048; G06N 20/00–20
USPC .............................. 706/12, 14, 15, 25, 45–61
See application file for complete search history.

(56) References Cited

U.S. PATENT DOCUMENTS

| | | | |
|---|---|---|---|
| 10,296,848 B1* | 5/2019 | Mars | G06N 20/20 |
| 10,810,491 B1* | 10/2020 | Xia | G06N 3/08 |
| 10,956,132 B1* | 3/2021 | Schneider | G06F 8/40 |
| 2016/0232457 A1* | 8/2016 | Gray | G06F 16/26 |
| 2019/0019106 A1* | 1/2019 | Driscoll | G06N 20/00 |
| 2019/0050683 A1* | 2/2019 | Gupta Hyde | G06K 9/6257 |
| 2019/0087835 A1* | 3/2019 | Schwed | H04L 43/04 |
| 2019/0095785 A1* | 3/2019 | Sarkar | G06N 20/00 |
| 2019/0141048 A1* | 5/2019 | Fallah | H04L 63/102 |
| 2020/0005193 A1* | 1/2020 | Nie | G06F 11/0709 |
| 2020/0184380 A1* | 6/2020 | Thomas | G06N 20/20 |
| 2020/0218940 A1* | 7/2020 | Anglin | G06K 9/6268 |
| 2020/0226496 A1* | 7/2020 | Basu | G06N 20/00 |
| 2021/0142206 A1* | 5/2021 | Ghanea-Hercock | G06F 9/448 |

* cited by examiner

*Primary Examiner* — Jue Louie
(74) *Attorney, Agent, or Firm* — Butzel Long; Donald J. Lecher

(57) ABSTRACT

The system and methods of the disclosed subject matter provide an experimentation framework to allow a user to perform machine learning experiments on tenant data within a multi-tenant database system. The system may provide an experimental interface to allow modification of machine learning algorithms, machine learning parameters, and tenant data fields. The user may be prohibited from viewing any of the tenant data or may be permitted to view only a portion of the tenant data. Upon generating an experimental model using the experimental interface, the user may view results comparing the performance of the experimental model with a current production model.

20 Claims, 5 Drawing Sheets ental machine learning algorithm, in which the automated machine learning system generates at least an initial machine learning model of a plurality of machine learning models based on the plurality of machine learning algorithms in response to a request for a prediction based on a first tenant's data. The method may include receiving a modification to at least one of the machine learning algorithms, modifying the initial machine learning algorithm using the modification to generate an experimental machine learning algorithm, generating an experimental machine learning model using the plurality of machine learning algorithms and the experimental machine learning algorithm, generating an indication of the performance of the experimental machine learning model, providing an indication of the performance of the experimental machine learning model with the performance of at least the initial machine learning model of the plurality of machine learning models, and/or restricting a machine learning system operator from viewing any of the first tenant's data based on a permission parameter. The request for a prediction may be received from a single tenant, while the performance of the experimental machine learning model may be determined based upon an application to data received from multiple tenants. The method may additionally include receiving modeling parameters for the experimental machine learning model, the modeling parameters including at least one selected from the group consisting of hyperparameter settings, a selection of one or more machine learning algorithms, and a selection of classes of features or fields to be removed from the first tenant's data. The experimental machine learning model may be generated based on a received selection of tenant datasets and a temporal cutoff parameter. The modification to the machine learning algorithm or algorithms may be received from the machine learning system operator. The method may further include receiving a selection of machine learning models of the plurality of machine learning models for the comparing with the performance of the experimental machine learning model. The method may further include determining a subset of data of the first tenant's data from which the generation of the initial machine learning model was based by generating and using metadata associated with the results of executing the initial machine learning model based on the first tenant's data.
FRAMEWORK FOR MULTI-TENANT DATA SCIENCE EXPERIMENTS AT-SCALE

BACKGROUND

Machine learning systems analyze an existing dataset to generate models that can be used to make predictions based on a new set of data inputs. This system may be known as a prediction engine. The predictive engine typically includes a data processing framework and one or more algorithms trained and configured based on prior datasets. Such predictive engines are deployed to generate prediction results upon request. The existing dataset may include data inputs with their corresponding outputs, from which the model is generated. The generated model may then produce a predicted output based the new set of data inputs. The accuracy of the model can be ascertained, given a set of data inputs, by comparing the known data outputs with the predicted data outputs produced by the model.

Machine learning models may be generated with greater accuracy when provided with large numbers of accurate, existing datasets. For example, when predicting a lead score, that is, the likelihood that a sales lead will convert to an actual sale, large datasets describing the features of each customer and his or her associated transactions may be utilized to generate a model. Unfortunately for the user (e.g., a data scientist or computer engineer), these large datasets containing real customer data within the multi-tenant environment are typically restricted for various reasons relating to customer privacy, security, or other concerns. As a result, the user may be limited to using artificial or otherwise fake customer data when experimenting with improvements or modifications to the machine learning system, which may be produce less accurate results.

BRIEF SUMMARY

According to embodiments of the disclosed subject matter, systems, media, and methods of modifying an automated machine learning system may include a plurality of machine learning algorithms, including an initial machine learning algorithm, in which the automated machine learning system generates at least an initial machine learning model of a plurality of machine learning models based on the plurality of machine learning algorithms in response to a request for a prediction based on a first tenant's data. The method may include receiving a modification to at least one of the machine learning algorithms, modifying the initial machine learning algorithm using the modification to generate an experimental machine learning algorithm, generating an experimental machine learning model using the plurality of machine learning algorithms and the experimental machine learning algorithm, generating an indication of the performance of the experimental machine learning model, providing an indication of the performance of the experimental machine learning model with the performance of at least the initial machine learning model of the plurality of machine learning models, and/or restricting a machine learning system operator from viewing any of the first tenant's data based on a permission parameter. The request for a prediction may be received from a single tenant, while the performance of the experimental machine learning model may be determined based upon an application to data received from multiple tenants. The method may additionally include receiving modeling parameters for the experimental machine learning model, the modeling parameters including at least one selected from the group consisting of hyperparameter settings, a selection of one or more machine learning algorithms, and a selection of classes of features or fields to be removed from the first tenant's data. The experimental machine learning model may be generated based on a received selection of tenant datasets and a temporal cutoff parameter. The modification to the machine learning algorithm or algorithms may be received from the machine learning system operator. The method may further include receiving a selection of machine learning models of the plurality of machine learning models for the comparing with the performance of the experimental machine learning model. The method may further include determining a subset of data of the first tenant's data from which the generation of the initial machine learning model was based by generating and using metadata associated with the results of executing the initial machine learning model based on the first tenant's data.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

As previously disclosed, a data scientist may wish to conduct machine learning experiments on large volumes of real tenant data to generate more accurate results than could be achieved using artificial tenant data. Because real tenant data may be restricted from the data scientist's view, it is desirable to provide an experimentation framework that allows for carrying out machine learning experiments while respecting the privacy and confidentiality of the tenant data. In this way, machine learning experiments carried out on the disclosed experimentation framework may achieve accurate results that may not otherwise be possible when not based on the authentic, voluminous, and complex datasets found within multi-tenant database systems.

The present subject matter discloses an experimentation framework providing an experimentation interface for carrying out experiments on real tenant data. The disclosed experimentation framework and associated method may allow a user to perform experiments within a multi-tenant database system by receiving experimental modeling data that reflects modifications to machine learning algorithms and feature engineering. The experimentation interface may also allow the user to provide experimental configuration settings, such as modified hyperparameters, modified tenant datasets that may be used for training an experimental model and may also allow the user to specify conditions for benchmarking the experimental model against existing production models.

Figure 1:
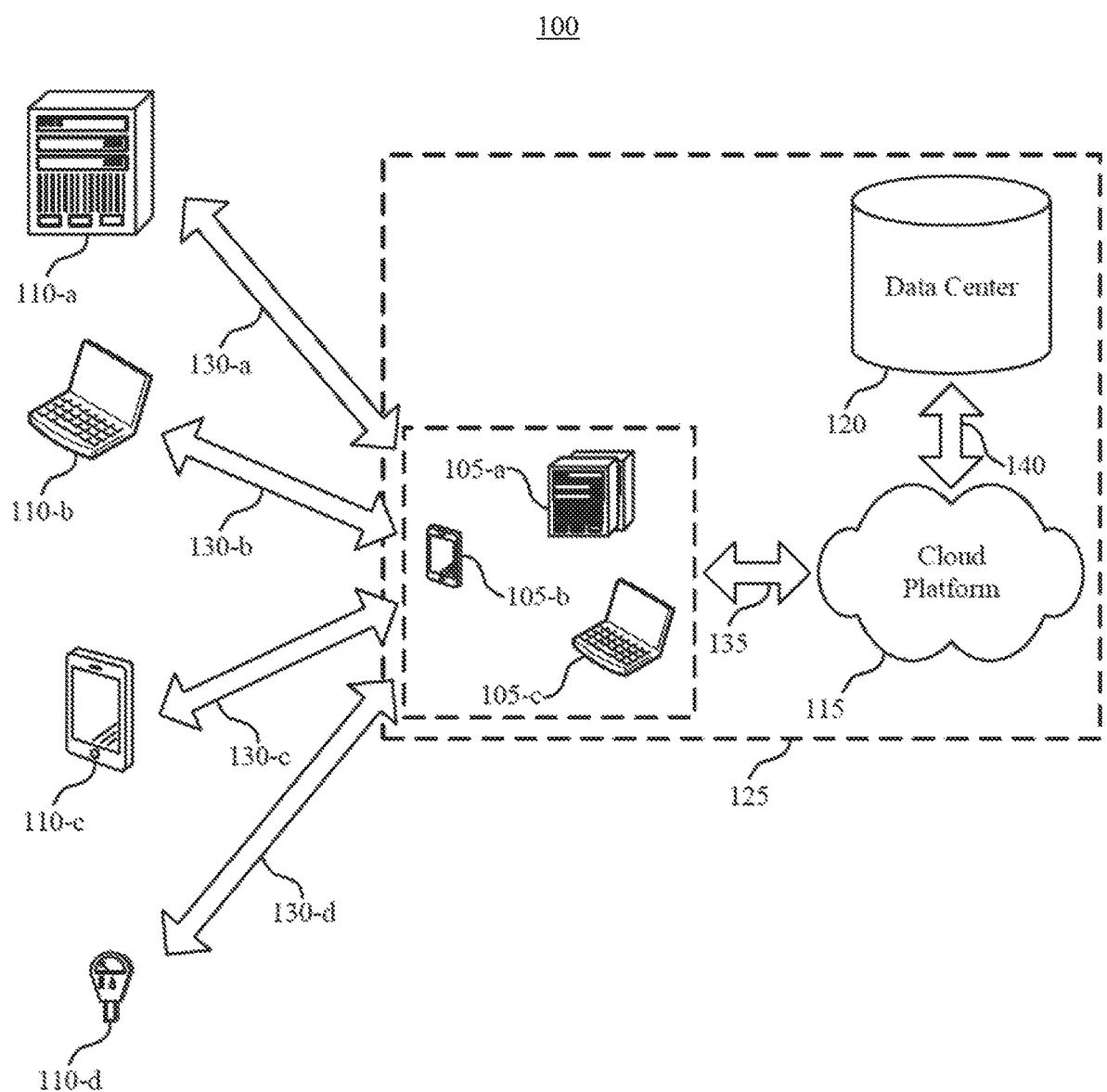
FIG. 1 illustrates an example of a system for accessing data in a multi-tenant data store in accordance with aspects of the present disclosure.

FIG. 1 illustrates an example of a system 100 for cloud computing that supports a framework for multi-tenant data science experiments at-scale in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud platform 115 may utilize a machine learning model on data received from one or more cloud clients 105 to enhance interactions 130 between a contact 110 and the associated cloud client 105. For example, the machine learning may enable the cloud client 105 to predict a certain interaction 130 that the contact 110 intends to utilize based on historical data received and stored in the cloud platform 115 and a data center 120. The machine learning may include gathering data, preparing data, feature engineering, model training, scoring steps, or some combination of these or other similar processes involving running complex data process workflows and jobs. In some cases, gathering and preparing data may further include accessing one or more data objects associated with one or more tenants in a multi-tenant data store (e.g., the data center 120, or a component of the data center 120) in order to test (e.g., debug) code or machine-learning algorithms using the data objects. However, the data objects may include sensitive tenant data. As such, an access control system for securely accessing data for one or more of the tenants may be established.

To set up secure environments for code testing and machine learning, the access control system may first receive approval from an authorized approver (e.g., a cloud client 105) granting access to data objects in the multi-tenant data store. The access control system may determine tenant-specific paths for accessing or retrieving the data objects from the multi-tenant data store and may initialize a number of virtual computing engines for accessing the data objects. Each virtual computing engine may be tenant-specific based on the tenant-specific paths used by that virtual computing engine (e.g., each virtual computing engine may correspond to a separate tenant). Additionally, each virtual computing engine may include an access role (e.g., an identity and access management (IAM) role) defining the data objects or data object types accessible by that virtual computing engine or defining other permissions for the data access. By accessing the requested data objects according to the tenant-specific paths and access roles, the virtual computing engines may securely maintain separate environments for different tenants and may only allow user access to approved tenant data.

In conventional systems, data testing may not securely support multi-tenancy. For example, in some cases, granting multi-tenant database access to a user may allow the user to perform code testing or machine learning on any of the data in the database. In such cases, the data testing may result in mixing of data between tenants. Additionally, users with access to the data testing environment may be able to access data for multiple tenants, and in some cases may be able to modify this data in the database. In other cases, users may only be able to perform code testing or machine learning on a single tenant in a multi-tenant database.

The system 100 may support isolated data testing environments for different tenants in a multi-tenant system. For example, by spinning up separate clusters (e.g., virtual computing engines) on a tenant-by-tenant basis, the system 100 may not mix sensitive data for different tenants but may support code testing and machine learning across multiple tenants. Additionally, a malicious user gaining access to a data testing environment may only gain access to data for a single tenant (e.g., the tenant associated with that data testing environment), and may not be able to modify that data in data center 120 based on the permissions associated with the computing cluster. In some cases, utilizing tokens, access roles, or both may stop even malicious users who access the data testing environments from loading data objects from the multi-tenant data store. By incorporating approvers for granting or denying access to data on a tenant-by-tenant basis, the system 100 may add another layer of security to the data access service.

Figure 2:
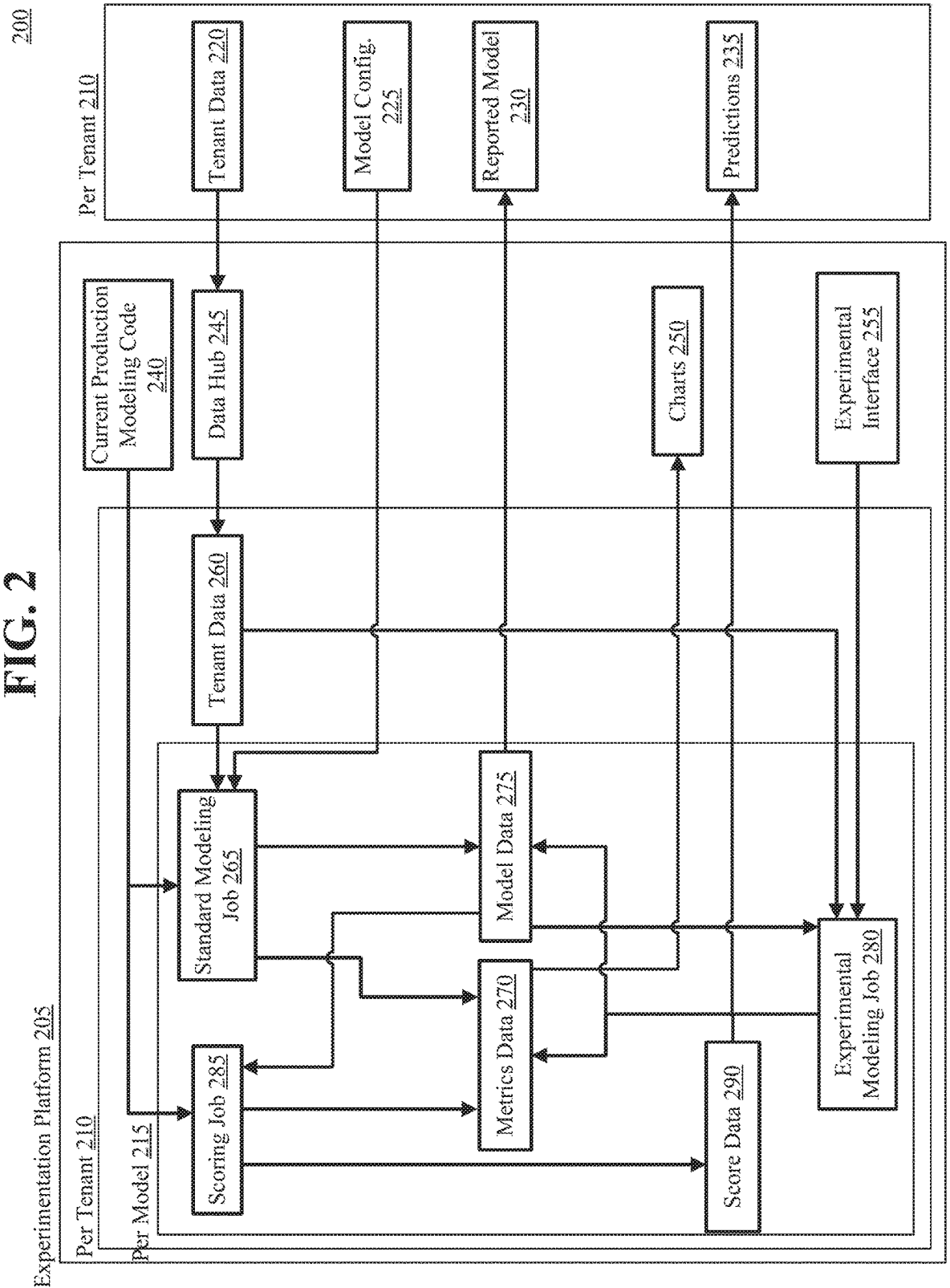
FIG. 2 illustrates a block diagram of a system according to an embodiment of the disclosed subject matter.

FIG. 2 is a block diagram of an experimentation framework 200 suitable for use in a multi-tenant data store as described with respect to FIG. 1, or other environments in which it may be desirable to provide a similar framework to data scientists, internal developers, or the like. The components of framework 200 may be classified in terms of a per model layer 215, a per organization layer 210, and an experimentation platform layer 205. It should be understood from FIG. 2 that each of the components within per model layer 215 may exist for each machine learning model, that each of the components within per tenant layer 210 may exist for each tenant, and that each of the components within experimentation platform layer 205 may exist for each experimentation platform established within the framework 200. Each tenant within the multi-tenant system may have associated tenant-specific data 220, such as for example, customer data related to sales leads, account numbers, and various other data objects. As disclosed previously, at least some of tenant-specific data 220 may be deemed sensitive and unavailable for viewing to a non-tenant user, such as a data scientist or machine learning system operator.

Within the experimentation platform layer 205, data hub 245 may provide aggregate storage of one or more tenant-specific data 220, along with storage of score data 290, metrics data 270, model data 275, and metadata. The metadata may describe, for one or more types of data within data hub 245, which tenant each type of data is related to and whether the data was generated from another dataset or datasets. Where data was generated from one or more other datasets, the metadata may provide a reference identifier of one or more of the other datasets. Score data 290 may include data representing the likelihood of a predicted result to occur using the standard model generated by the current production modeling code 240 after execution by standard modeling job 265. The score data 290 may be subsequently used in displaying one or more predictions 235 to a tenant user within tenant layer 210. The predictions 235 may be displayed to a tenant user in response to a tenant user's request for a prediction based on at least one tenant's data 220 of a plurality of tenants' data stored in data hub 245. Predictions 235 located within tenant layer 210 may be based on the current production modeling code 240. Metrics data 270 may characterize the performance of the current production model generated using standard modeling job 265 and based on current production modeling code 240, as well as the experimental model generated using experimental modeling job 280 and based on experimental modeling algorithms, data, and parameters received via experimental interface 255. Metrics data 270 may indicate, for example, success or failure, success rates, and other metrics that characterize the performance of each model, such as a confusion matrix, area under receiver operating characteristic curve (AuROC), area under precision-recall curve (AuPR), F1 score, and root mean square error (RMSE). The metrics data generated by each of the standard modeling job 265 and experimental modeling job 280 may be stored in metrics data 270 as separate datasets. Metrics data 270 may be created at any time, but preferably when one or more of the standard modeling job 265 and experimental modeling job 280 execute.

Model data 275 may include serialized versions of the best model determined, according to one or more of the example metrics discussed previously and may be provided to the user in reported model 230. Model data 275 may include a tag associated with the best model determined that may indicate whether the model is a current production model generated based on current production modeling code 240 or an experimental model generated based on experimental modeling data. Model data 275 may also include the parameters of the associated models needed to generate the score. For example, a regression model stored in model data 275 may also include the terms and coefficients of the regression, and a random forest model may also include the tree structures and the decision criteria at each node in the trees.

Also included within experimentation platform layer 205, charts 250 may include visualizations of metrics data 270 to compare the results of the standard model generated by standard modeling job 265 with the results of the experimental model generated by experimental modeling job 280. Charts 250 and the associated visualizations may be useful in monitoring the quality of the machine learning models.

Current production modeling code 240 may include a copy of the current production version of modeling code for each machine learning model utilized within framework 200. The current production modeling code 240 may be stored in a memory within the experimentation platform layer 205. In addition to the current production version of modeling code for one or more machine learning models, the memory may also store versions of modeling code predating or postdating the current production version.

Each tenant of the multi-tenant system 100 may store its associated tenant data 220 in data hub 245. The standard modeling job 265 may execute the current production modeling code 240 using some or all of the tenant data 220 stored in data hub 245 as tenant training data 260 and using model configuration parameters 225 to generate an initial machine learning model, which may be stored in model data 275. The standard modeling job 265 may execute at any time, but preferably whenever a prediction is created or edited by a tenant user, or when a new tenant enrolls in lead scoring. Standard modeling job 265 may also execute on a periodic schedule, such as monthly, daily, weekly, and the like. Model configuration parameters 225 may include hyperparameters, a selection of machine learning algorithms, and/or modifications to be made to the training tenant data 260 dataset.

Scoring job 285 may score models previously generated and stored in model data 275. Scoring job 285 may also utilize the current production modeling code 240 using some or all of the tenant training data 260 and may deserialize a model and the model's associated parameters from model data 275. The deserialization routine may be a stored within current production modeling code 240. The deserialized model from model data 275 may be loaded into a memory associated with scoring job 285 and used to calculate one or more scores. The calculated one or more scores may be stored in score data 290. Scoring job 285 may also store metrics data, such as the number of records scored or percentile distributions of the scores, in metrics data 270. Scoring job 285 may execute at any time, but preferably immediately after the standard modeling job 265 executes to obtain initial scores or according to a periodic schedule. Scoring job 285 may utilize the identical tenant training data 260 as standard modeling job 265.

Experimental interface 255, which may also be organized within the experimentation platform layer 205, may allow a user to interface with the experimentation framework 200. At experimental interface 255, the experimentation framework 200 may receive experimental modeling data from a user. The experimental modeling data may reflect modifications to machine learning algorithms. Alternatively, or in addition, the experimental interface 255 may allow the user to specify a version of modeling code to run an experiment. The experimental modeling data may include modifications to the extract-transform-load (ETL) process, including modifying how feature engineering is performed and modifying automated feature removal.

The experimental interface 255 may additionally allow modification to the input data to one or more machine learning models, such as by modifying data fields, features, dependent variables, and records. More generally, lists of datasets may be specified for use with some machine learning models and not others. Datasets may also be specified for use with benchmark models. Benchmark models may be used for comparison with subsequent experiments. For example, after updating a portion of a model and obtaining acceptable experimental results for the updated model, it may be determined that the updated model should be provided for use with tenant data. At this point an experiment id corresponding to the model may be designated as a benchmark to which subsequent experiments will be compared. For example, in the results interfaces such as graphs and dashboards disclosed herein, new experiments may be compared to such a benchmark experiment. Graphs, charts, and other visualizations may be generated with reference to one or more benchmark models using charts 250. Datasets may also be specified according to a temporal cutoff parameter, for example, according to when the data was created, last modified, last accessed, and the like. For each dataset, one or more machine learning models may be trained and evaluation statistics on additional datasets, as well as hold-out sets may generated by experimental modeling job 280. Datasets specified as input may be received, combined, and then randomly split to create the training set and the hold-out set. The experimental models may be trained using the training set and checked against the hold-out set. The results of this check and associated statistics may be stored in metrics data 270. In addition to receiving training datasets from the user, experimental interface 255 may receive evaluation datasets, which may be similar to the training datasets but retrieved from a different point in time, for example. This may allow for additional evaluation and modification features, such as where a benchmark experiment is used to determine how a modified model has performed within the system after a period of time. If the accuracy of the model decreased, it may be addressed by making further modifications to the model and re-running the experiment with the further-modified model to see how it performs over the same period.

The experimental interface 255 may additional allow modification to the modeling parameters, such as through selection of the machine learning algorithms and their associated hyperparameters. Experimental interface 255 may also allow the user to specify which models of a plurality of experimental and/or production models should be used for benchmarking. It should be appreciated that the term "modifying" includes additions or appends, removals or truncations, and/or replacements of all or a portion of the subject being modified. For example, modifying data may include adding additional data, deleting data, replacing data, and/or a combination of all three. Modifying a process may include adding additional steps, removing steps, replacing steps, and/or a combination of all three.

Experimental modeling job 280 may utilize the experimental modeling data received and/or selected by the user through experimental interface 255. The experimental modeling job 280 may also receive and utilize metadata associated with the model data 275 to determine which and/or what portions of the tenant training data 260 is being used with the current production modeling code 240 and from which generation of the model using the standard modeling job 265 is based. In this way, the experimental modeling job 280 may train on the same tenant training data 260 as the standard modeling job 265. Data that reflects comparing the standard and experimental models may be subsequently generated using metrics data 270 and model data 275 in response to a query from charts 250, for example. As discussed previously, the model data 275 may include serialized versions of the best model amongst the models generated by the standard 265 and experimental 280 modeling jobs and may provide this information to the user in the form of reported model 230. Experimental modeling job 280 may be run at any time, but preferably in response to an act by a user of experimental interface 255 or in response to experimental modeling code being checked-in to a version control repository branch.

While the experimental modeling job 280 may determine which tenant training data 260 was used to train the standard model computed by standard modeling job 265, the user may be restricted from viewing any of the tenant training data 260 or may be only able to view a partial amount of the tenant training data 260 based on a permission parameter, such as the permission level discussed previously. Both tenant and non-tenant users may use the experimental interface 255 and view the tenant training data 260 subject to the privileges associated with his or her permission level.

Figure 3:
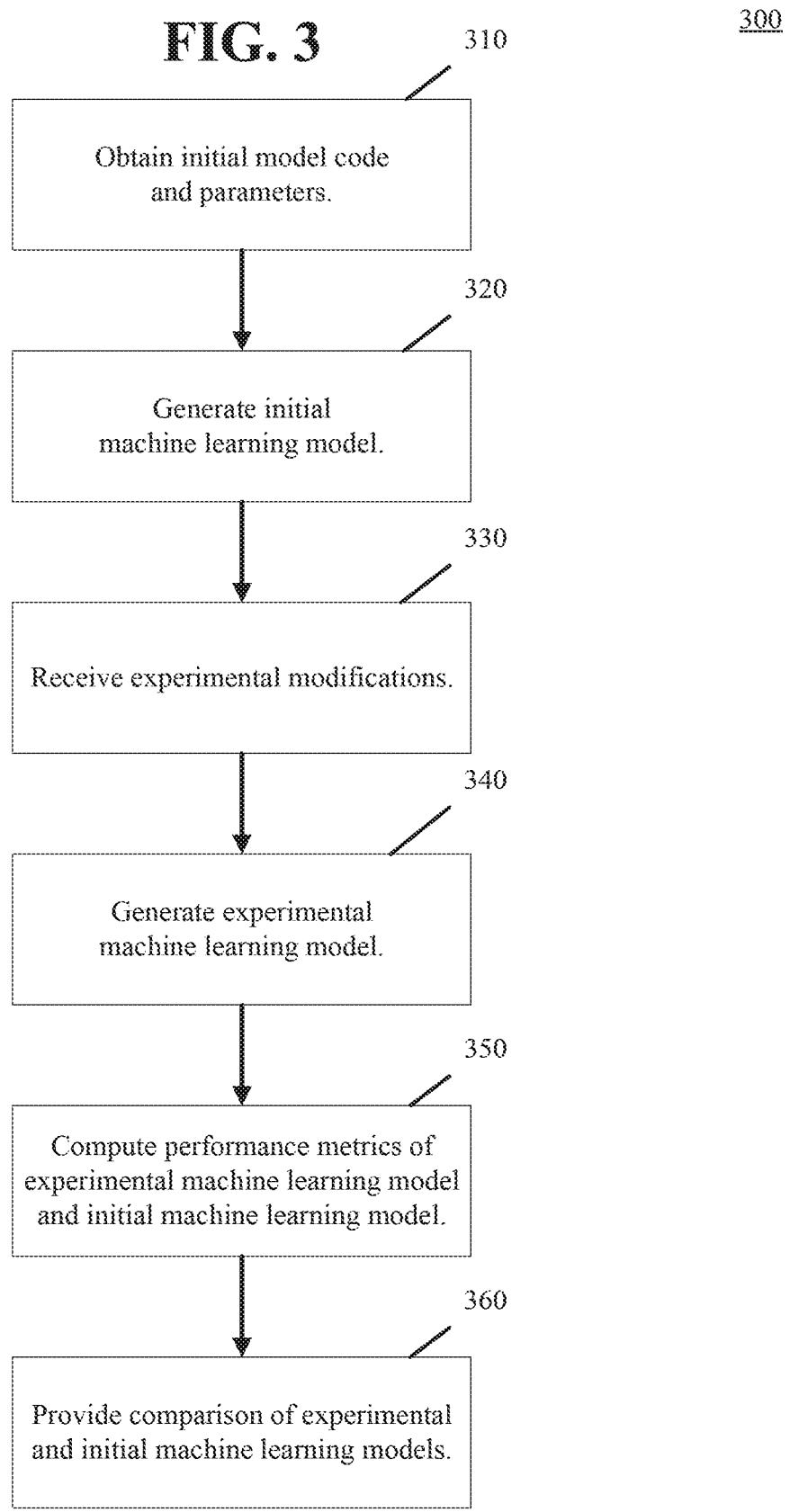
FIG. 3 illustrates a flow diagram of a method according to an embodiment of the disclosed subject matter.

FIG. 3 is a flow diagram illustrating an example of a method 300 for providing an experimentation framework 200. A process as shown in FIG. 3 may be performed, for example, by an experimentation platform 205 or other component of a multi-tenant data store as previously disclosed, or by any other suitable computerized system having access to the appropriate tenant data. Notably, the entire process may be performed without providing access to any tenant data to a data scientist or other user that performs an experiment according to the process. That is, although the user may be provided with information indicating how the experimental machine learning model performs relative to an initial machine learning model in the system, the user may not be able to access any of the tenant data that is used to evaluate performance of either machine learning model. This contrasts with conventional machine learning systems, which require the user to have access to the data used to evaluate the machine learning model or to use special testing data that is not actual tenant data.

At 310, the tenant layer 210 of the experimentation framework 200 may obtain the production modeling code 240, tenant training data 260 retrieved from data hub 245, and model configuration parameters 225 for generating one or more initial machine learning models. Each initial machine learning model may be based on one or more machine learning algorithms. The tenant training data 260 may be used as training data to train the initial machine learning model. It should be appreciated that some of the tenant training data 260 may not be used to train the model but rather set aside as a holdout dataset to be subsequently used for verifying the accuracy of the initial machine learning model. The model configuration parameters 225 may include hyperparameters for configuring the execution of the model itself, as well as hyperparameters for configuring feature engineering. The model configuration parameters may further include a selection of machine learning algorithms, and/or modifications to be made to the tenant training data 260 dataset, including the addition, replacement, and deletion of tenant data fields. At 320, the initial machine learning model may be generated using the tenant training data 260 and model configuration parameters 225 obtained in 310 by executing standard modeling job 265.

At 330, one or more modifications to at least one machine learning model in the system may be received from the user, for example, via the experimental interface 255 as previously disclosed. The modification may be to an algorithm used to generate the machine learning model, to a parameter or hyperparameter of the algorithm, the model, or the feature engineering process, to limits, boundary conditions, to data types or parameters used to generate the machine learning model, to classes, features, fields, or other attributes of tenant data to be used with the experimental machine learning model, or to any other attribute or condition of one or more models, or any combination thereof. Furthermore, modeling parameters for the experimental machine learning model may be received from the user. For example, the modeling parameters may include one or more of hyperparameter settings, a selection of one or more machine learning algorithms, and a selection of classes of features or fields to be removed from the first tenant's data. At 340, the experimental machine learning model may be generated using the modifications, data, and parameters obtained in 330 in conjunction with executing experimental modeling job 280.

At 350, performance metrics of the initial machine learning model and experimental machine learning model may be computed in metrics data stage 270. The metrics may indicate, for example, success or failure, success rates, and other statistics that characterize the performance of each model. It should be appreciated that evaluation of the experimental and/or initial machine learning models may occur after step 340 as shown in FIG. 3 or may occur at any other time. Preferably, evaluation of the models may be performed in response to a request received to evaluate one or both of the initial and experimental machine learning models. Metrics computed in metrics data stage 270 may be used to generate visualizations of the performance in charts stage 250. In step 360, the visualizations generated by charts stage 250 may be used to generate additional visualizations or data that compare the performance of the experimental machine learning model with one or more of the initial machine learning models.

Embodiments disclosed herein may allow for more efficient analysis and experimentation on real tenant data than would be achievable using conventional techniques. For example, an experimentation framework may be constructed more efficiently than comparable conventional machine learning techniques may achieve, and/or individual experiments may be created to a user using fewer computational resources than would be possible using conventional techniques. This is due to the use of the experimental interface, as previously disclosed, which allows for rapid experimentation and use of the techniques disclosed herein, without a loss of generality or accuracy. Additionally, embodiments disclosed herein may overcome the associated disadvantages appearing in conventional multi-tenant frameworks, where the user may not perform experiments on real tenant data. Instead, the user may be limited to conducting data science experiments using artificial data that may lack the volume and complexity of real tenant data, and therefore, may produce less accurate results. The described embodiments of the present subject matter previously discussed may overcome these disadvantages.

Figure 4:
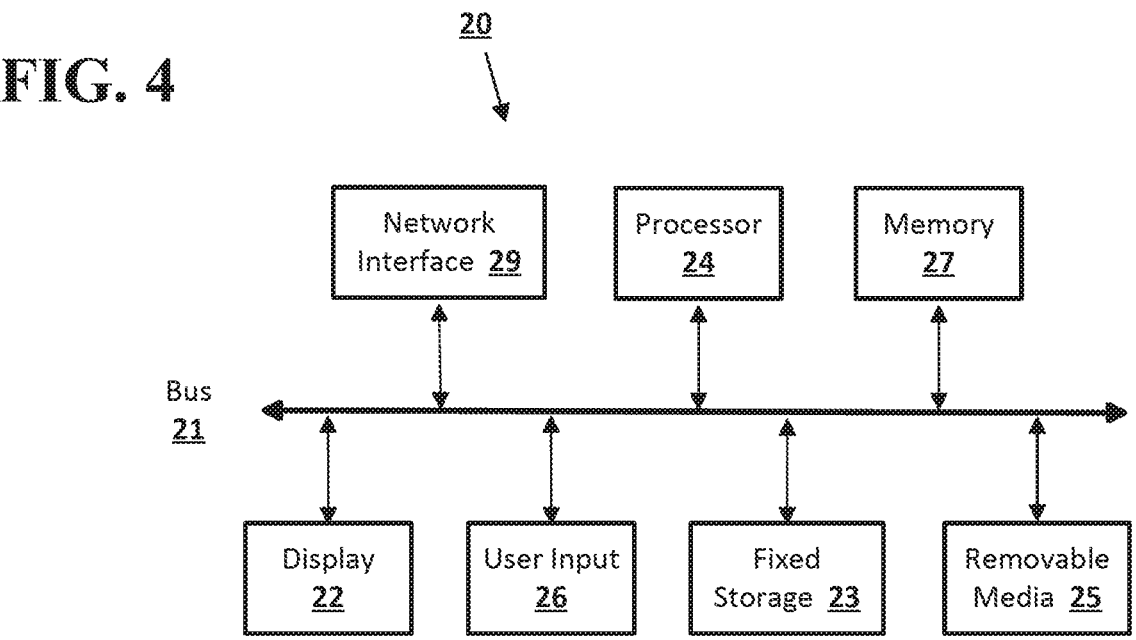
FIG. 4 shows a computing device according to an embodiment of the disclosed subject matter.

Embodiments of the presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
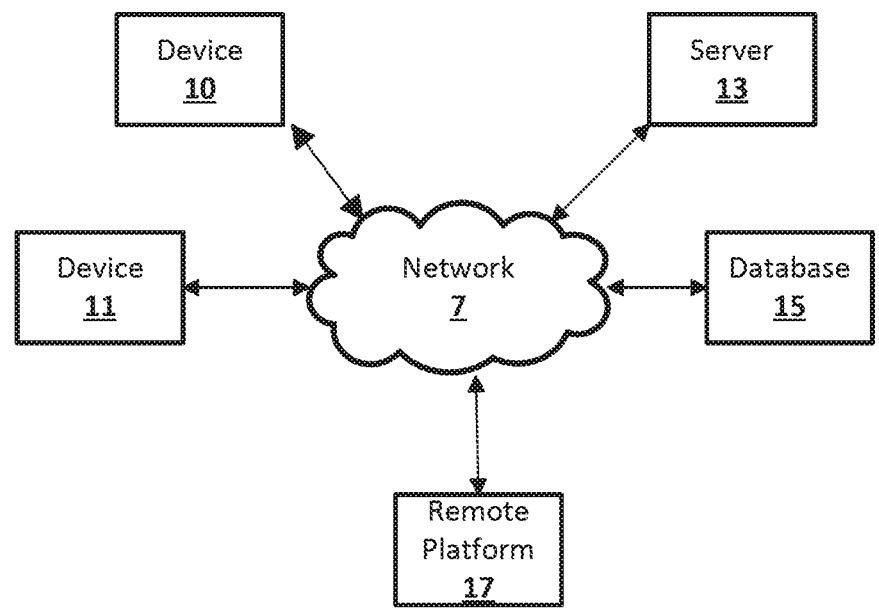
FIG. 5 shows a network configuration according to an embodiment of the disclosed subject matter.

FIG. 5 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 6:
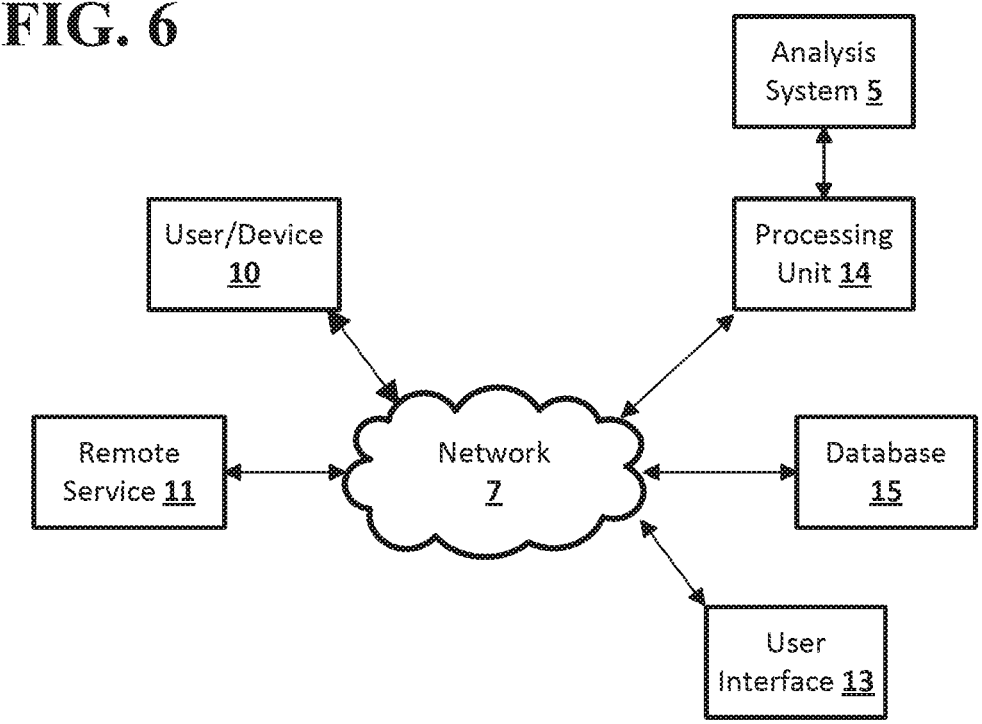
FIG. 6 shows an example network and system configuration according to an embodiment of the disclosed subject matter

FIG. 6 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of modifying an automated machine learning system, the automated machine learning system comprising a plurality of machine learning algorithms, including an initial machine learning algorithm, wherein the automated machine learning system generates at least an initial machine learning model of a plurality of machine learning models based on the plurality of machine learning algorithms in response to a request for a prediction based on a first tenant's data, the method comprising:
- receiving, through an experimental interface, experimental modeling data reflecting at least one modification to at least one of the plurality of machine learning algorithms of the initial machine learning model;
- modifying the initial machine learning algorithm of the plurality of machine learning algorithms using the at least one modification to generate an experimental machine learning algorithm;
- generating an experimental machine learning model using the experimental machine learning algorithm;
- determining, based on metadata associated with model data from the initial machine learning model, which portion of the first tenant's data is being used to train the initial machine learning model;
- generating an indication of a performance of the experimental machine learning model with the experimental modeling data operating on the determined portion of the first tenant's data; and
- comparing the indication of the performance of the experimental machine learning model with a performance of at least the initial machine learning model of the plurality of machine learning models operating on the determined portion of the first tenant's data,
- wherein the experimental interface restricts a machine learning system operator from viewing any of the first tenant's data based on a permission parameter.

2. The method of claim 1, wherein the request for a prediction is from a single tenant and the performance of the experimental machine learning model is determined based upon an application to data received from multiple tenants.

3. The method of claim 1, further comprising:
receiving modeling parameters for the experimental machine learning model, the modeling parameters including at least one selected from the group consisting of hyperparameter settings, a selection of one or more machine learning algorithms, and a selection of classes of features or fields to be removed from the first tenant's data.

4. The method of claim 1, wherein the experimental machine learning model is generated based on a received selection of tenant datasets and a temporal cutoff parameter.

5. The method of claim 1, wherein the modification to the at least one of the plurality of machine learning algorithms is received from the machine learning system operator.

6. The method of claim 1, further comprising:
receiving a selection of machine learning models of the plurality of machine learning models for the comparing with the performance of the experimental machine learning model.

7. The method of claim 1, further comprising:
determining a subset of data of the first tenant's data from which the generation of the initial machine learning model was based by generating and using metadata associated with the results of executing the initial machine learning model based on the first tenant's data.

8. An automated machine learning system comprising:
a processor;
a memory in communication with the processor, the memory storing a plurality of machine learning algorithms, including an initial machine learning algorithm; and
instructions stored in the memory and executable by the processor to cause the system to:
- generate at least an initial machine learning model of a plurality of machine learning models based on the plurality of machine learning algorithms in response to a request for a prediction based on a first tenant's data;
- receive, through an experimental interface, experimental modeling data reflecting at least one modification to at least one of the plurality of machine learning algorithms of the initial machine learning model;
- modify the initial machine learning algorithm of the plurality of machine learning algorithms using the at least one modification to generate an experimental machine learning algorithm;
- generate an experimental machine learning model using the experimental machine learning algorithm;
- determine, based on metadata associated with model data from the initial machine learning model, which portion of the first tenant's data is being used to train the initial machine learning model;
- generate an indication of a performance of the experimental machine learning model with the experimental modeling data operating on the determined portion of the first tenant's data;
- compare the indication of the performance of the experimental machine learning model with the performance of at least the initial machine learning model of the plurality of machine learning models operating on the determined portion of the first tenant's data,
- wherein the experimental interface restricts a machine learning system operator from viewing any of the first tenant's data based on a permission parameter.

9. The system of claim 8, wherein the request for a prediction is from a single tenant and the performance of the experimental machine learning model is determined based upon an application to data received from multiple tenants.

10. The system of claim 8, further comprising instructions executable by the processor to cause the system to:
receive modeling parameters for the experimental machine learning model, the modeling parameters including at least one selected from the group consisting of hyperparameter settings, a selection of one or more machine learning algorithms, and a selection of classes of features or fields to be removed from the first tenant's data.

11. The system of claim 8, wherein the experimental machine learning model is generated based on a received selection of tenant datasets and a temporal cutoff parameter.

12. The system of claim 8, wherein the modification to the at least one of the plurality of machine learning algorithms is received from the machine learning system operator.

13. The system of claim 8, further comprising instructions executable by the processor to cause the system to:
receive a selection of machine learning models of the plurality of machine learning models for the comparing with the performance of the experimental machine learning model.

14. The system of claim 8, further comprising instructions executable by the processor to cause the system to:
determine a subset of data of the first tenant's data from which the generation of the initial machine learning model was based by generating and using metadata associated with the results of executing the initial machine learning model based on the first tenant's data.

15. A non-transitory computer-readable medium storing a plurality of instructions which, when executed by a processor, perform a method of modifying an automated machine learning system, the automated machine learning system comprising a plurality of machine learning algorithms, including an initial machine learning algorithm, wherein the automated machine learning system generates at least an initial machine learning model of a plurality of machine learning models based on the plurality of machine learning algorithms in response to a request for a prediction based on a first tenant's data, the method comprising:
- receiving, through an experimental interface, experimental modeling data reflecting at least one modification to at least one of the plurality of machine learning algorithms of the initial machine learning model;
- modifying the initial machine learning algorithm of the plurality of machine learning algorithms using the at least one modification to generate an experimental machine learning algorithm;
- generating an experimental machine learning model using the experimental machine learning algorithm;
- determine, based on metadata associated with model data from the initial machine learning model, which portion of the first tenant's data being is used to train the initial machine learning model;
- generating an indication of a performance of the experimental machine learning model with the experimental modeling data operating on the determined portion of the first tenant's data; and
- comparing the indication of the performance of the experimental machine learning model with the performance of at least the initial machine learning model of the plurality of machine learning models operating on the determined portion of the first tenant's data,
- wherein the experimental interface restricts a machine learning system operator from viewing any of the first tenant's data based on a permission parameter.

16. The medium of claim 15, wherein the request for a prediction is from a single tenant and the performance of the experimental machine learning model is determined based upon an application to data received from multiple tenants.

17. The medium of claim 15, further comprising:
- receiving modeling parameters for the experimental machine learning model, the modeling parameters including at least one selected from the group consisting of hyperparameter settings, a selection of one or more machine learning algorithms, and a selection of classes of features or fields to be removed from the first tenant's data.

18. The medium of claim 15, wherein the experimental machine learning model is generated based on a received selection of tenant datasets and a temporal cutoff parameter.

19. The medium of claim 15, further comprising:
- receiving a selection of machine learning models of the plurality of machine learning models for the comparing with the performance of the experimental machine learning model.

20. The medium of claim 15, further comprising:
- determining a subset of data of the first tenant's data from which the generation of the initial machine learning model was based by generating and using metadata associated with the results of executing the initial machine learning model based on the first tenant's data.

* * * * *